United States Patent [19]
Landesman et al.

[11] Patent Number: 6,022,033
[45] Date of Patent: Feb. 8, 2000

[54] UNIVERSAL CART FOR PRINTING ACCESSORIES

[75] Inventors: Benjamin J. Landesman; David A. Landesman, both of St. Louis, Mo.

[73] Assignee: Lawson Screen Products, Inc., St. Louis, Mo.

[21] Appl. No.: 08/936,597

[22] Filed: Sep. 24, 1997

[51] Int. Cl.⁷ .................................................. B62B 3/00
[52] U.S. Cl. ........................................................ 280/47.35
[58] Field of Search ........................... 280/47.35, 79.3; 211/70.6, 94.02, 162; 101/127.1; 206/372

[56] References Cited

U.S. PATENT DOCUMENTS

| | | | |
|---|---|---|---|
| D. 182,483 | 4/1958 | Skinner | D34/21 |
| 1,562,089 | 11/1925 | Holley | 108/101 |
| 2,560,059 | 7/1951 | Young | 280/47.35 |
| 2,981,549 | 4/1961 | Hotton | 280/47.35 |
| 3,007,708 | 11/1961 | Ochs | 280/79.3 |
| 3,435,956 | 4/1969 | Ulitsch | 280/47.35 |
| 4,165,088 | 8/1979 | Nelson | 280/47.35 |
| 4,923,202 | 5/1990 | Breveglieri et al. | 280/47.35 |
| 4,958,841 | 9/1990 | Keen | 280/47.35 |
| 5,489,106 | 2/1996 | Engelking et al. | 280/47.35 |
| 5,586,665 | 12/1996 | Brousseau | 211/59.2 |

*Primary Examiner*—Brian L. Johnson
*Assistant Examiner*—Faye M. Fleming
*Attorney, Agent, or Firm*—Blackwell Sanders Peper Martin

[57] ABSTRACT

A cart for maintaining items specifically used in the printing industry includes four upright support members disposed in pairs substantially parallel and spaced apart from one another to define the corners of a box shape having a rectangular plan view. Rectangular frame members are horizontally disposed, one spacedly above the other and connected at each one of the four respective corners to one of the four upright support members. A plurality of hanger brackets are connected to and depend from the rectangular frame members and are suitably sized and shaped to receive and retain, in a suspended, substantially vertical position accessories, tools and supplies commonly used in the printing industry.

16 Claims, 4 Drawing Sheets

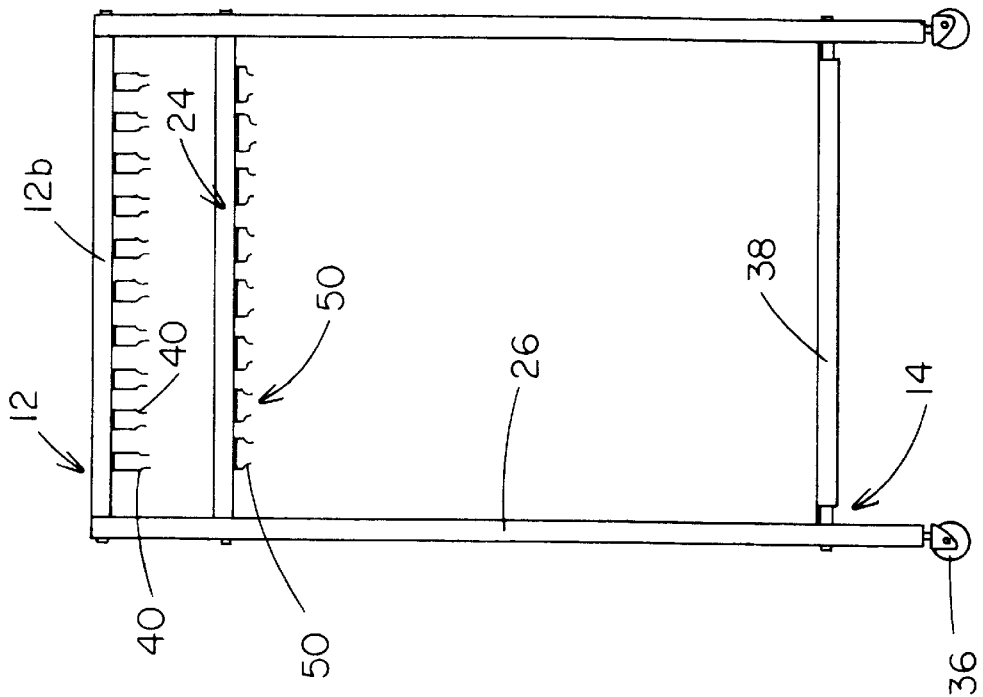
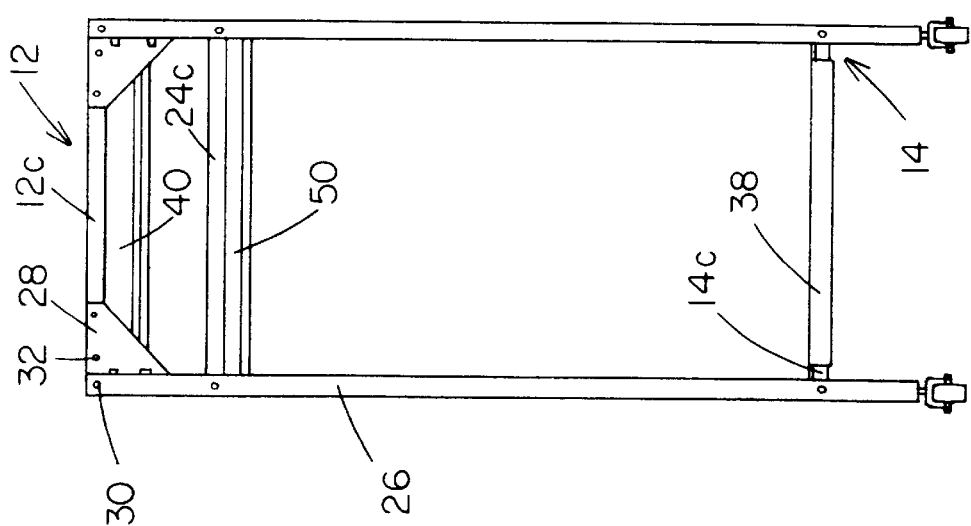
FIG. 5
FIG. 4

UNIVERSAL CART FOR PRINTING ACCESSORIES

BACKGROUND AND SUMMARY OF THE INVENTION

The present invention relates generally to the field of movable carts, and, more particularly, to a movable cart which is designed specifically for holding equipment, accessories and supplies of the type frequently used in the screen printing industry.

Operation of a screen printing facility is often a fairly messy business. Print screens of the type used for printing posters and textiles, such as are used in t-shirt shops, are usually treated with a light sensitive photographic emulsion coating prior to use in making a printing plate. Particularly when printing in various colors is intended, a number of such coated screens are required. Thus, wet screens must be placed for draining and drying in a position which prevents smearing of the design on the screen. Previously this meant using a great deal of space and inevitably resulted in pools of emulsion solution which would be tracked about the work area.

Wet screen racks, brushes, solution containers, ink flood bars, spreading tools ("squeegees") and other miscellaneous and sundry items generally clutter the work area, creating a potential safety hazard, as well as being unsightly and causing a less efficient work environment.

Conventionally, storage of some printing items, including parts of the printing presses, whether wet or dry, was merely by hanging items on a wall or post by a nail, or, for example, by propping a screen up against a wall to dry, or storing a plurality of clamps and/or other miscellaneous hardware in a cardboard box where the items become tangled and may rust if damp when stored. The usual practice is to lay squeegees flat, horizontally, to dry, sometimes causing buildup on the blade.

Notable features of the new cart include the specially designed hanging brackets/bracket shelves from which the blades and squeegees are suspended by insertion of their mounting ends (opposite the blade portion). Another optional mounting device includes a flat bar which is sized and positioned so as to releasably receive the adjustable mount brackets used to suspend printing squeegees.

The new universal printing cart dramatically improves set-up time, production and clean-up in a printing operation. The new cart is ideal for organizing and storing all printing aids, for example, squeegees, flood bars, clamps, screens, ink, spatulas, spray adhesive, press wash, clips, t-squares, etc. As described further herein, the new cart provides an easy, inexpensive way to significantly improve the organization of virtually any print shop. The cart is designed in a modular manner to accommodate individual needs and preferences. The customer needs only to purchase the options and features needed for a particular printing site.

Accordingly, it is among the objects of the present invention to provide a highly versatile device, or apparatus in the general form of a cart for conveniently, economically and neatly storing a variety of devices, tools and supplies of the myriad types used in the screen printing industry, and which cart can thus be said to be "universal" in its applications, and that such cart be suitable for storing printer's tools and supplies in a handy, organized, easy to access position which facilitates drainage of wet items.

It is further among the objects of the present invention, having the features indicated, that the new device be compact or "modular" and adapted for ready mobility to further enhance its use, and that the new universal cart be easy to assemble by an individual with little or no instruction and using, at most, only a few readily available, common hand tools, and that such apparatus be adapted for assembly in a manner which is facile, and suitable for customizing for a particular user's preference, including at least temporary storage of quantities of heavy supplies, such as buckets of emulsion or ink.

Accordingly, in keeping with the above-mentioned goals, the present invention is, briefly, a cart for maintaining items specifically used in the printing industry. The new cart includes four upright support members disposed in pairs substantially parallel and spaced apart from one another to define the corners of a box shape having a rectangular plan view. Rectangular frame members are horizontally disposed, one spacedly above the other and connected at each one of the four respective corners to one of the four upright support members. A plurality of hanger brackets are connected to and depend from the rectangular frame members and are suitably sized and shaped to receive and retain, in a suspended, substantially vertical position accessories, tools and supplies commonly used in the printing industry.

The invention further includes, briefly, at least one shelf supported on a preselected one of the rectangular frame members, spacedly above the floor or other support surface, to thereby provide a surface for support of a printer's items which cannot be hung from the hanger brackets.

These and other objects will be in part pointed out and in part apparent in the description hereafter.

BRIEF DESCRIPTION OF THE DRAWINGS

FIG. 4 is an end elevational view of the cart of FIG. 1, empty, the opposite end being substantially identical.

FIG. 5 is a side elevational view of the cart of FIG. 1, empty, the opposite side being substantially identical.

Throughout the drawings like parts will be indicated by like element numbers. In some views some elements have been omitted for simplicity and clarity of the drawings.

DESCRIPTION OF THE PREFERRED EMBODIMENT

With reference to the drawings, 10 generally designates a cart for printing supplies, which cart is constructed in accordance with and embodies the present invention. Cart 10 generally includes an upright open framework adapted for supporting specialized brackets for hanging printing supplies and tools or accessories, and optionally for supporting above the floor a variety of heavy, wet, or otherwise awkward items and devices commonly used in the printing industry.

Figure 2:
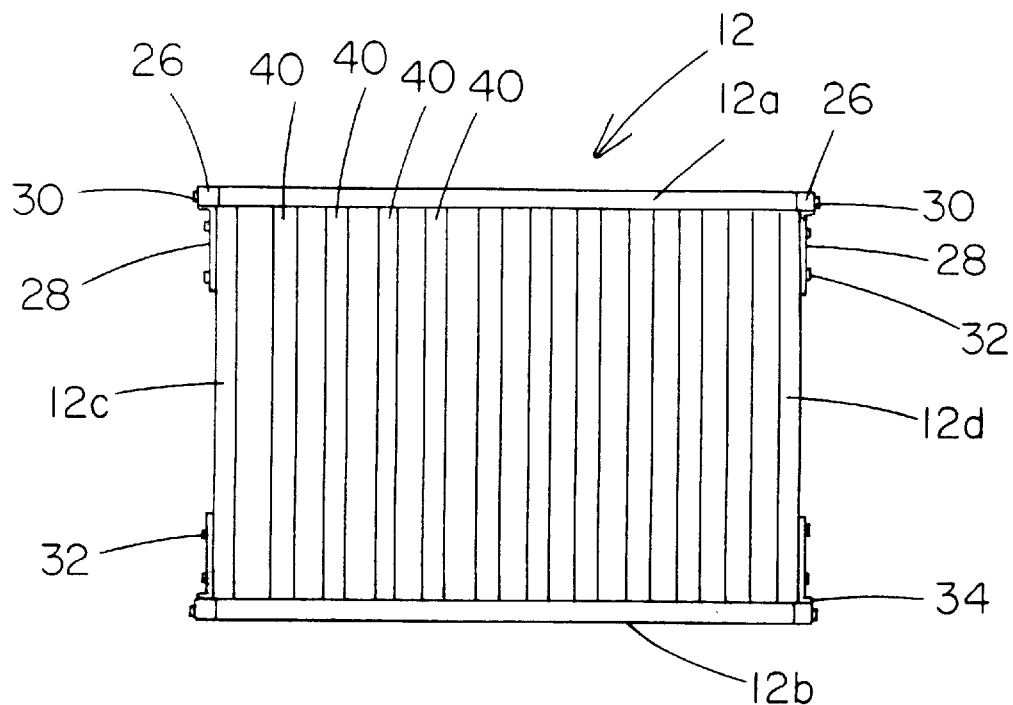
FIG. 2 is a top plan view of the cart of FIG. 1, with the print screen frames and floor casters omitted for clarity and simplicity of the drawings.

Cart 10 includes at least two rectangular, frame members indicated generally at 12, 14, which are disposed substantially horizontally when cart 10 is in its normal, upright, operative position for maintaining a variety of supplies and accessories for printing. Rectangular frame members 12, 14 are disposed spacedly and parallel to one another, and have connected to each of the four corners thereof an upright support member (or leg) 26, so as to form the general shape of an open box with a preferably rectangular plan view, as shown in FIG. 2.

Although it is conceivable that cart 10 could have some other horizontal sectional shape, it is believed that the rectangular shape illustrated is that which is most convenient for the intended purpose. More specifically, it is preferred that cart 10 is approximately fifty-two inches high, about twenty-one inches deep and about thirty-six inches long. These dimensions or course can be varied by the manufacturer customizing the new cart to the preference of the customer. However, when manufactured to the preferred specifications, the new cart can be readily shipped, unassembled, by commonly available shipping service providers without incurring additional or unusual charges due to package size.

Optionally at least one additional rectangular frame member 24 can be disposed spacedly between and parallel to the rectangular frame members at the top and bottom of the cart.

Although cart 10 is preferably formed substantially entirely of metal, as specified further hereafter, it can instead be formed at least in part of other materials, such as wood or plastic, as long as the materials selected are sufficiently strong and otherwise to serve the described purpose. For example, the upright members could be formed of a wood, such as oak, and the tool suspending brackets may conceivably be formed by molding of a strong and resilient plastic.

It is further to be understood that while as shown and described, for simplicity and economy of manufacture and use, cart 10 has effectively identical end views and identical side views, the new cart does not necessarily have to be so constructed. More complex modifications will be described and others will no doubt be apparent to one skilled in the art.

Rectangular frame members 12, 14, 24 are all preferably formed of straight, rigid bars or tubes of preferably square cross-section, although other shapes, such as cylindrical rods or tubes will suffice, although possibly not as effectively. Each such rectangular frame member necessarily has two parallel long sides, designated for purposes of this discussion as "a" and "b", disposed transversely to two parallel short sides, similarly designated "c" and "d". The short and long sides are firmly connected, for example by welding, at their respective ends, to form a flat, rigid rectangle which lends strength and support to the structure of device 10.

FIGS. 1, 2, 4 and 5 illustrate the preferred manner of connection of the rectangular frame members 12, 14, and 24 to the upright supports 26. First, it is preferred that a fastener 30, such as a ¼ inch bolt be passed through the top of each upright member, to coaxially engage an end of one of the long side portions a, b of a rectangular frame member 12, 14 and 24, which end is positioned adjacent to the upright member at a predetermined distance along the length of the upright member. Of course, in order that the rectangular frame members can be substantially parallel to one another, the preselected distances at which they are attached to each of the four upright supports is necessarily substantially the same at each corner of cart 10.

The four upright supports 26 each have connected at their respective upper ends, a flanged corner bracket 28 which is securely, but preferably removably, attached by fasteners, such as #10 Phillips head sheet metal screws (indicated at 32), for example, along a vertically disposed flange 34 of the bracket.

Each corner bracket 28 is similarly connected along a horizontally positioned upper edge thereof by one or more fasteners 32 to an adjacent end of one of the short sides 12c, 12d of the uppermost rectangular frame member, to thereby lend further structural support to each point of connection of the upper ends of the four upright members to rectangular frame member 12. At the opposite, lowermost ends of each upright member 26 there is preferably provided a rotatable caster 36, of a generally known and available style, or other appropriate and equivalent means, to effect facile rotating or even sliding movement of cart 10 from one position to another on the floor or other support surface, even while fully loaded with printing supplies and/or accessories.

Figure 1:
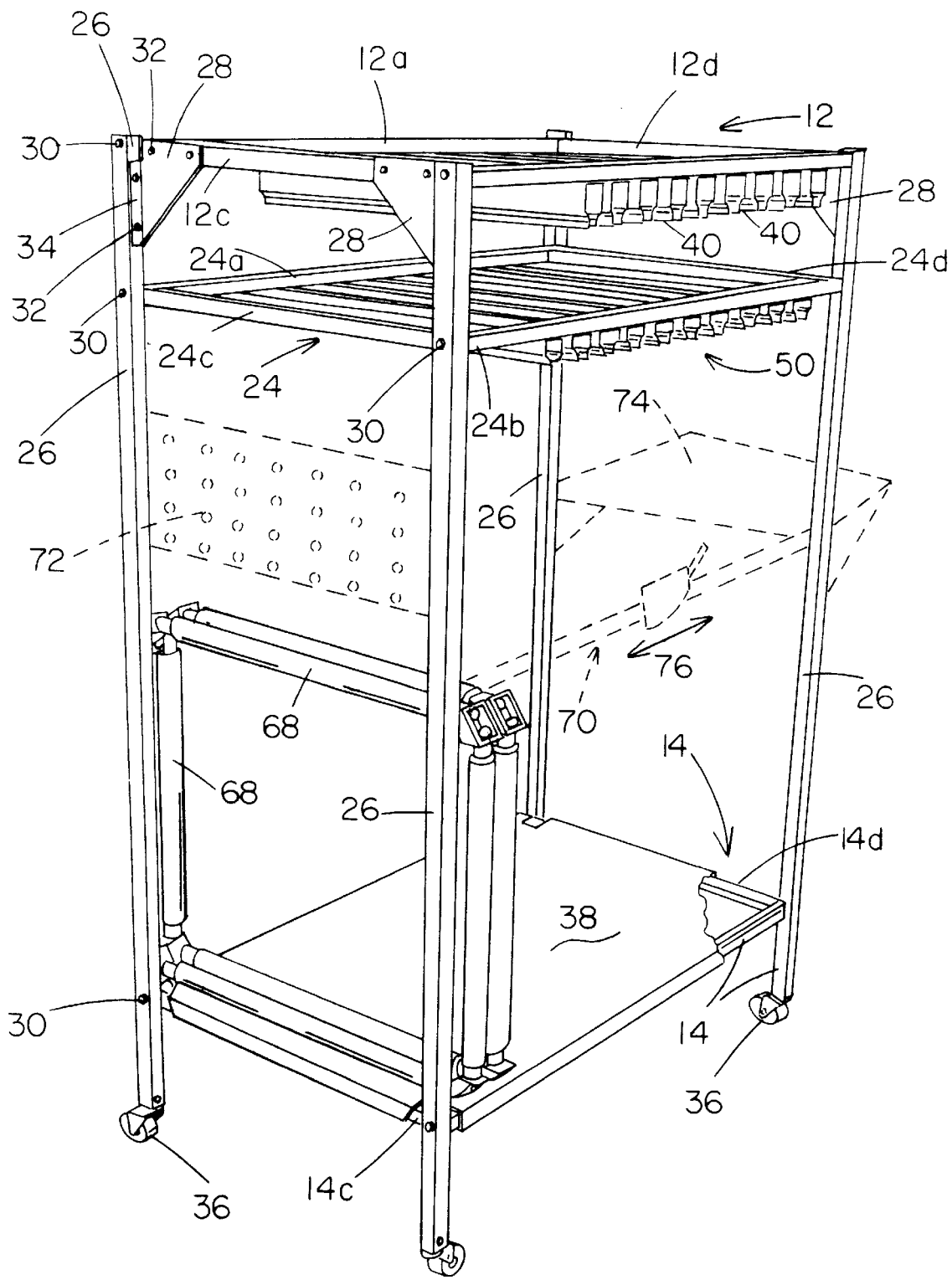
FIG. 1 is a perspective view, partially broken away, of a universal cart for printing supplies, the cart being constructed in accordance with and embodying the present invention and showing conventional print screen frames resting on edge on a shelf of the cart, and with some optional features of the invention shown in broken lines.

FIGS. 1, 4 and 5 show that lowermost rectangular frame member 14 is disposed spacedly above the support surface and is preferably provided with an optional shelf 38 for support of heavy, awkward or wet items, and the like, such as screen frames 68 (shown in FIG. 1 only). Shelf 38 may be formed of a sheet of metal, such as aluminum or galvanized steel, which is effectively wrapped around the edges or perimeter formed by rectangular frame member portions 14a, 14b, 14c and 14d, omitting the areas attached and immediately adjacent to corner uprights 26, as shown. Shelf 38 may also be formed of some other known material, such as fiber board, particle board or plywood, which although heavier, may provide the required strength and a suitable flat storage surface for the intended printer's items.

Alternatively, it is conceivable that in some print shops it would be preferred to substitute at heavy mesh or screening for the solid surface shown for shelf 38. This is merely one example of a way in which cart 10 can be customized to a particular print shops' needs. Optionally, the buyer can purchase an adjustable screen holder clamp assembly or system, indicated in phantom at 70, which is formed generally of a rail which connects to the upright members on one long side of cart 10 to slidably carry an adjustable member which can be moved in the directions indicated by arrows 76, toward or away from screen frame(s) supported vertically on shelf 38, to deter the frame(s) from shifting or falling over, especially if cart 10 is moved.

Other optional features, shown in phantom in FIG. 1 are a piece of peg-board 72, mounted to one side or end of cart 10, so as to provide a site for hanging various objects, either to the outside or to the inside of the perimeter of the cart, a side a side-mounted shelf 74, which can be connected to cart 10 in any known manner so as to extend outwardly, most probably from one end of the cart, for support of small objects which the user of cart 10 may wish to have most readily at hand.

FIG. 2 shows, in top plan view, one style of specialized, elongated bracket 40, which has been designed to be particularly well suited for suspending certain printing tools from a rectangular frame portion of cart 10. Although ten brackets 40 are shown here, only nine are shown in FIG. 1, for simplicity and clarity of the figures. Nonetheless, in the preferred standard size device 10, squeegee/flood bar bracket "shelf" 24 will usually be provided with twelve, parallel mounted specialized brackets.

Figure 3:
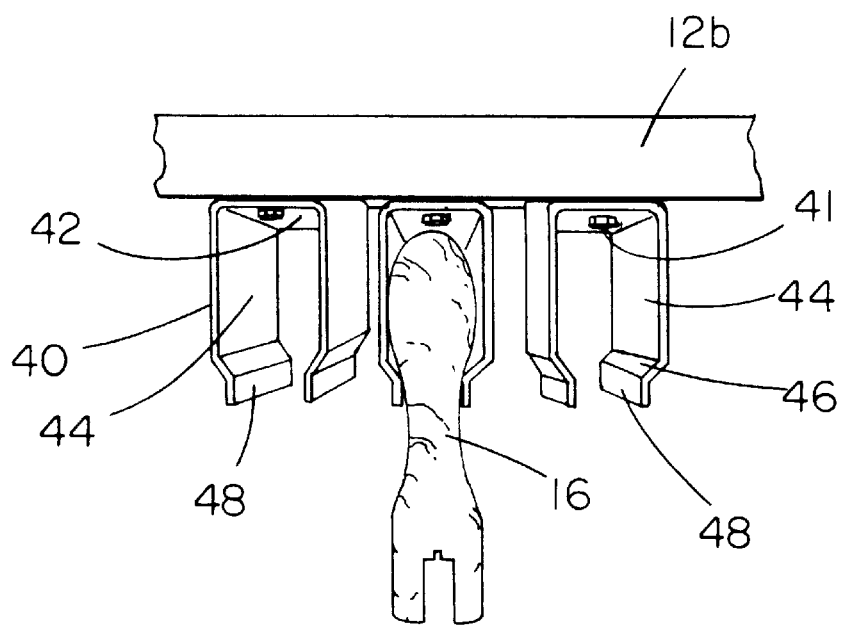
FIG. 3 an enlarged partial front perspective view of the top rectangular frame or rack of the cart shown in FIG. 1 and also showing a printer's tool handle to illustrate an optional use of the new cart.

Three brackets 40 are shown in side view in FIG. 4 (end view shown in FIG. 5), but are most clearly illustrated in the perspectives of FIG. 1 and FIG. 3, in the latter of which there is shown suspended a wooden handle of a common printer's tool 16. As with the other new styles of brackets herein described, a plurality of identical brackets can be connected side-by-side, somewhat spaced apart, but parallel to one another, along the entire length of a given rectangular frame member. Alternatively, the bracket styles can be mixed on a give "bracket shelf" or rectangular frame member.

Each bracket 40 is formed preferably of metal in the shape of an elongated, upside down channel with a flat top wall 42 and two parallel, continuous side walls 44 which define a channel space between them which is sized and shaped for receipt and suspended, vertical maintenance of the handle portion of printer's tool 16. Any given bracket 40 is connected to cart 10 by inserting a connector such as a screw 41, brad, or other suitable fastener through top wall 42 (via an aperture, not shown) at each of the two extreme ends of the bracket, upwardly and into the lower side of the supporting long portion 12a and 12b at the corresponding end of the bracket. Thus, the length of the brackets 40 must correspond to the distance between the side rails, long portions 12a, 12b. A plurality of brackets 40 are intended to be suspended from rectangular supporting framework 12, as shown, in parallel to one another.

When positioned for use on cart 10 channel walls 44 depend toward the floor and, adjacent the lower most ends, the walls angle inwardly toward each other, at 46, for a distance a fraction of the length of wall 44, and then terminate in a substantially vertical depending lower edge 48.

Preferably parallel lower edges 48 are spaced apart from one another on a given bracket, but not so far as to permit the handle of tool 16 to fall out of the channel. Rather, edges 48 act to retain tool 16 in a substantially vertical position for either long-term storage, or simply for temporary holding, as for air drying. Of course, brackets 40 can be provided in a variety of sizes, depending upon the tools used most frequently in a given print shop.

Figure 6:
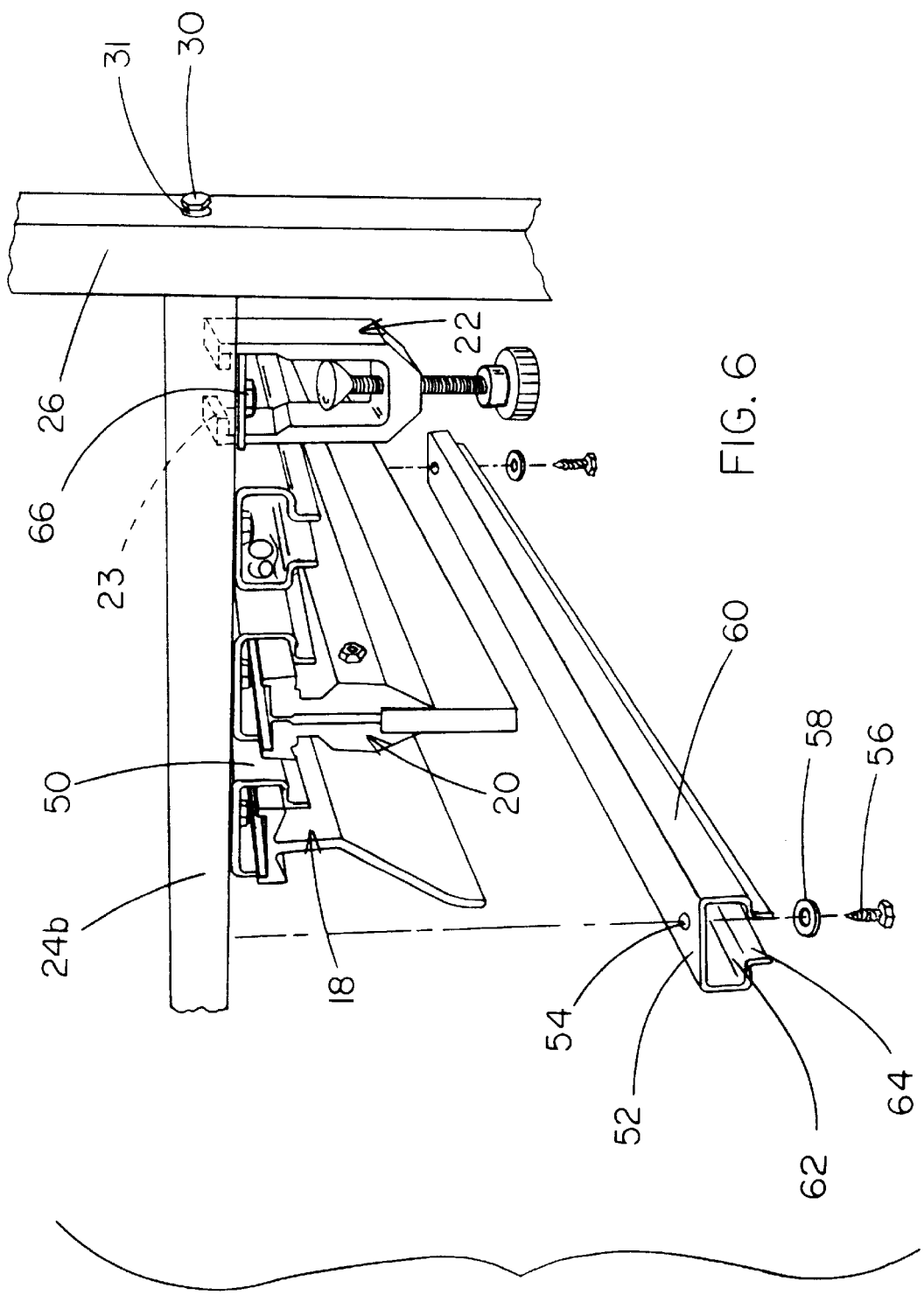
FIG. 6 is an enlarged, partial perspective view of a portion of the cart of FIG. 1, partly exploded, with various types of printing equipment maintained thereon, to illustrate another use of the new cart.

Accordingly, an alternative new bracket, indicated at 50 is shown suspended in like manner as that previously described. However, in this case, bracket 50 is connected to intermediately positioned rectangular framework 24. An enlargement of this specific new bracket style is seen in FIG. 6, illustrated as maintaining in position a variety of types of printing accessories. Elongated brackets 50 are essentially a shorter version of brackets 40, lacking the angled wall portion. Brackets 50 have a flat top wall 52 with an aperture 54 formed in each end thereof for insertion of a screw 56, for connection to long side rails 24a, 24b, with optional placement of a washer 58 (such as a lock washer or the like) between the screw head and the inner surface of top wall 52, as shown in the exploded view of FIG. 6.

Brackets 50 also have paired, parallel, depending side walls 60. However, walls 60 are substantially shorter than the side walls on the first described brackets 40 and immediately turn inwardly to form a narrow supporting shoulder or ledge 62, at a substantially right angle at the depending ends of walls 60, and then preferably, although not necessarily, extending downwardly and terminating in straight, parallel wall end 64. FIG. 6 shows brackets 50 as being useful to retain printer's items such as a squeegee 18 and a flood bar 20, for example.

FIG. 6 shows a still further alternative bracket 66 is effectively a metal strip adapted at each of its opposed ends with apertures (not seen) for connection by screws or other conventional fasteners to long portions of a rectangular framework (24b shown), as previously described with reference to the other brackets 40, 50. Bracket 66 is a handy style specifically for hanging support and storage of items such as clamps, like that indicated at 22, for example. Element number 23 indicates, in phantom, the inwardly directed arms of clamp 22 which can be easily directed over strip bracket 66 for loose, hanging support and readily removable access of the clamp.

Of course, the position of the particular bracket shelves can be interchanged, if preferred, as long there is sufficient room between vertically adjacent shelves (horizontal frames) for ready access to and clearance to permit hanging of a preselected printing tool or accessory. The new cart can even be ordered with an additional solid surface shelf, such as that shown at 38, which can be positioned at any preselected position between the uppermost and lowermost horizontal frame members; i.e., even above or below horizontal framework 24, for example for providing a surface for support of various small items or knick-knacks, such as pencils, note paper, a beeper or cellular phone, and the like.

Thus it is apparent that it is highly desirable that the new cart 10 be made available as a kit to be ordered with the framework of horizontal and vertical supports and a selection of sizes or styles of brackets, shelves and hardware therefor, as may suit the needs of the user. The new universal cart for printer's supplies can be readily custom designed for the user's needs. Ordinarily, the homemade storage racks presently used provide only for horizontal, shelf-like storage of blades, etc. The new vertical storage available in cart 10 is understood to be unique in the printing industry.

For example, the purchase can be provided with the base unit (the four corner uprights and two rectangular frames) with floor casters being standard equipment unless specifically requested to be omitted. Then, the customer can choose from a selection of option packages such as a squeegee and floor bar shelf for automatic presses with twelve specialized brackets per "shelf" (rectangular frame), a squeegee/flood bar clamp holder shelf with 18 specialized brackets per shelf, a manual squeegee shelf with twelve brackets per shelf, and adjustable screen holder clamp system, a side-mounted shelf 74, a side-mounted peg-board 72, a knick-knack storage shelf (not shown) and bottom shelf 38. To further customize the new cart substitutions in some of the above features are possible. For example, the number and style of brackets provided on a particular bracket shelf or frame can be mixed, with a given number of various styles, as desired for a particular shop. Also, although designed to be suitable for the "average" adult user, the new cart can be further customized by changes in overall size, if preferred.

In view of the foregoing, it will be seen that the several objects of the invention are achieved and other advantages are attained.

Although the foregoing includes a description of the best mode contemplated for carrying out the invention, various modifications will be apparent to the skilled artisan.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A cart for maintaining items used in the printing industry, comprising:

four upright support members, disposed in pairs substantially parallel and spaced apart from one another, to thereby define the corners of a box shape having a rectangular plan view, at least two rectangular frame members which are horizontally disposed, one spacedly above the other and connected at each on of the four respective corners to a corresponding one of the four upright support members, wherein each of the rectangular frame members includes two rigid, spaced apart, parallel long sides each having two ends, and two rigid, spaced apart, parallel short sides, each having two ends, a plurality of connectors suitable to secure the upright support members to the rectangular frame members, a plurality of elongated hangar brackets connected to and depending from at least one of the at least two rectangular frame members, wherein the plurality of hangar brackets are suitably sized and shaped to receive and retain, in a suspended, substantially vertical position, at least a portion of at least one accessory, tool, or supply commonly used in the printing industry, wherein at least one of the plurality of hangar brackets consists essentially of a substantially flat, elongated strip of material which is at least semi-rigid and sufficiently strong to serve as a hanging bracket to thereby receive clamps used in the printing industry, the substantially flat elongated strip of material having a length sufficient to entirely traverse the distance from one long side to another long side of the cart, the substantially flat elongated strip of material having two ends, the two ends of the strip being connected to opposed, parallel long sides of the cart, wherein the two ends selectively releasably receive and maintain printer's clamps on the cart in a substantially vertical, depending, hanging position.

2. The cart of claim 1, and further comprising at least one shelf supported on a preselected one of the at least two rectangular frame members, spacedly above the floor or other support surface, to thereby provide a surface for support of a printer's items which cannot be hung from the hanger brackets.

3. The cart of claim 2, wherein the at least one shelf is formed of a piece of sheet-like material supported within the perimeter of the cart by extending outer edges of the piece of sheet-like material over and at least partly around each of the preselected one of at least two rectangular frame members.

4. The cart of claim 1, wherein at least two of the at least two rectangular frame members have specialized hanger brackets connected to and depending therefrom to receive and maintain particular specialized printer's tools and accessories in a substantially vertical, hanging position.

5. A cart for maintaining items used in the printing industry, comprising:

four upright support members, disposed in pairs substantially parallel and spaced apart from one another, to thereby define the corners of a box shape having a rectangular plan view, at least two rectangular frame members which are horizontally disposed, one spacedly above the other and connected at each one of the four respective corners to a corresponding one of the four upright support members, wherein each of the rectangular frame members includes two rigid, spaced apart, parallel long sides each having two ends, and two rigid, spaced part, parallel short sides, each having two ends, a plurality of connectors suitable to secure the upright support members to the rectangular frame members, a plurality of elongated hangar brackets connected to and depending from at least one of the at least two rectangular frame members, wherein the plurality of hangar brackets are suitably sized and shaped to receive and retain, in a suspended, substantially vertical position, at least a portion of at least one accessory, tool, or supply used in the printing industry, and further wherein at least one of the plurality of hanger brackets consists essentially of a modified U-shaped channel bracket having a length sufficient to entirely traverse the distance from one side to the other long side of the cart, the at least one elongated, modified U-shaped, channel bracket having two ends, the two ends of the modified U-shaped channel bracket being connected to opposed, parallel long sides of the cart, wherein the two ends selectively releasably grippingly receive and maintain various preselected printer's tools and accessories on the cart in a depending, substantially vertical, hanging position.

6. A cart for maintaining items used in the printing industry, comprising:

four upright support members, disposed in pairs substantially parallel and spaced apart from one another, to thereby define the corners of a box shape having a rectangular plan view, at least two rectangular frame members which are horizontally disposed, one spacedly above the other and connected at each one of the four respective corners to a corresponding one of the four upright support members, a plurality of connectors suitable to secure the upright support members to the rectangular frame members, a plurality of elongated hangar brackets connected to and depending from at least one of the at least two rectangular frame members, wherein the plurality of hangar brackets are suitably sized and shaped to receive and retain, in a suspended, substantially vertical position, at least a portion of at least one accessory, tool, or supply used in the printing industry, at least one shelf supported on a preselected one of the at least two rectangular frame members, spacedly above the floor or other support surface, to thereby provide a surface on which to support printer's items which cannot be hung from the hanger brackets, and an adjustable screen holder clamp system mounted between two of the four upright members, on one long side of the cart, to thereby selectively adjustably retain screens of the type used in the printing industry in an upright storage position on the shelf cart.

7. A cart for maintaining items used in the printing industry, comprising:

four upright support members, disposed in pairs substantially parallel and spaced apart from one another, to thereby define the corners of a box shape having a rectangular plan view, at least two rectangular frame members which are horizontally disposed, one spacedly above the other and connected at each one of the four respective corners to a corresponding one of the four upright support members, a plurality of connectors suitable to secure the upright support members to the rectangular frame members, a plurality of elongated hangar brackets connected to and depending from at least one of the at least two rectangular frame members, wherein the plurality of hangar brackets are suitably sized and shaped to receive and retain, in a suspended, substantially vertical position, at least a portion of at least one accessory, tool, or supply used in the printing industry, and a shelf mounted to two of the four upright members of the cart and extending outwardly relative to the perimeter of the cart, to thereby provide additional storage space for items readily accessible by a user of the cart.

8. The cart of claim 1, and further comprising a piece of peg-board connected to two adjacent upright members, to thereby provide an area for hanging articles for use by a user of the cart.

9. The cart of claim 1, wherein the plurality of connectors includes a plurality of sheet metal screws.

10. A cart for maintaining items used in the printing industry, comprising:

four upright support members, disposed in pairs substantially parallel and spaced apart from one another, to thereby define the corners of a box shape having a rectangular plan view, at least two rectangular frame members which are horizontally disposed, one spacedly above the other and connected at each one of the four respective corners to a corresponding one of the four upright support members, a plurality of connectors suitable to secure the upright support members to the rectangular frame members, a plurality of elongated hangar brackets connected to and depending from at least one of the at least two rectangular frame members, wherein the plurality of hangar brackets are suitably sized and shaped to receive and retain, in a suspended, substantially vertical position, at least a portion of at least one accessory, tool, or supply used in the printing industry, at least four flanged corner brackets, one of said at least four flanged corner brackets being attached by one or more of the plurality of connectors to an upper end of each of the upright members and also to a corresponding, adjacent rectangular frame member, to thereby provide further strength and stability to the cart.

11. The cart of claim 1, and further comprising a caster mounted at a downwardly directed end of each of the four upright members, to thereby render the cart readily movable.

12. The cart of claim 1, wherein the cart is formed at least in part of metal.

13. An open-sided cart for use in the printing industry, comprising four upright members which define the four corners of a rectangular perimeter of the cart, and at least two shelf members mounted to the four upright members within the perimeter of the cart, means for providing selective movement connected beneath each of the four upright members, wherein the at least two shelf members comprise a first shelf member and a second shelf member, the first shelf member having structure to receive and maintain a first supply, accessory or tool used in the printing industry and the second shelf member having structure to receive and maintain a second supply, accessory or tool used in the printing industry, wherein at least one of the first shelf member and the second shelf member is provided with at least one depending bracket, the at least one depending bracket being elongated and suitably sized and shaped to receive and maintain at least one printing tool or accessory in a depending, substantially vertical hanging position, and further wherein the at least one depending bracket is channel-shaped with a modified U-shaped cross-section, a bottom portion and paired arms portions connected to the bottom portion, the bottom portion of the at least one depending bracket being positioned upwardly and connected to an underside of a preselected one of the first shelf member and the second shelf member, so that the paired arm portions of the bracket extend downwardly to thereby receive a portion of at least one printing tool or accessory, and a plurality of fasteners, at least one of the plurality of fasteners engaging each end of the at least one depending bracket and also engaging the underside of the preselected one of the first shelf member and the second shelf member.

14. The open-sided cart of claim 13, wherein at least one of the first shelf member and the second shelf member has a solid upper surface to thereby provide a place for support of printing supplies, accessories and tools that are not suited for hanging storage.

15. The open-sided cart of claim 13, wherein the downwardly extending paired arm portions are sufficiently transversely flexible to permit forcing apart with minimal manual pressure to receive the at least one printing tool or accessory, yet sufficiently inwardly biased to maintain the at least one printing tool or accessory within the bracket in a depending, substantially vertical, hanging position.

16. The open-sided cart of claim 15, and further wherein each arm of the downwardly extending paired arm portions has a downwardly directed end which is bent inwardly toward the other arm of the pair, yet remains sufficiently spaced from the other arm of the pair to readily receive at least a portion of the at least one printing tool or accessory.

* * * * *